E. LAKE.
Grain-Drill.
No 68,996. Patented Sept 17. 1867.
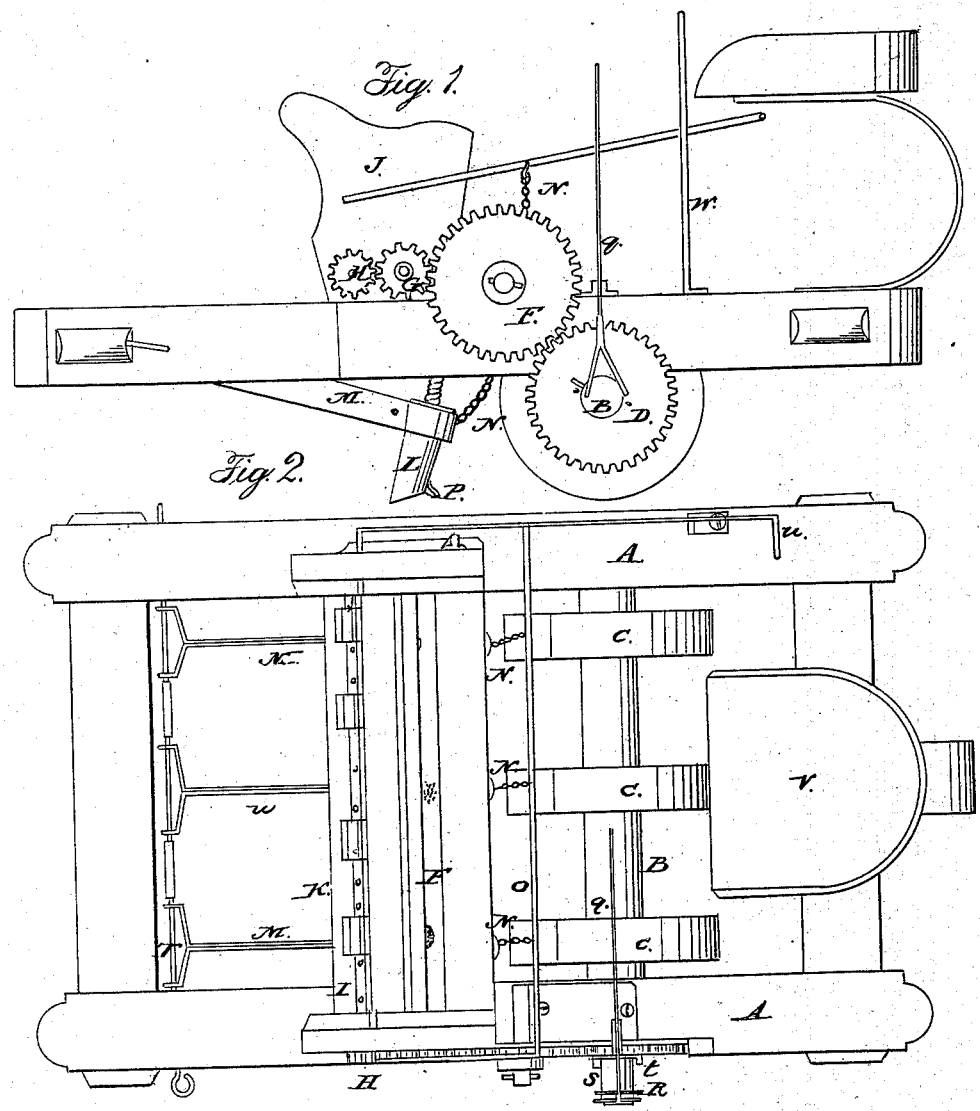

United States Patent Office.

ELIJAH LAKE, OF DAVISBURG, MICHIGAN.

Letters Patent No. 68,996, dated September 17, 1867.

---

IMPROVEMENT IN GRAIN-DRILLS.

---

The Schedule referred to in these Letters Patent and making part of the same.

---

TO ALL WHOM IT MAY CONCERN:

Be it known that I, ELIJAH LAKE, of Davisburg, in the county of Oakland, and in the State of Michigan, have invented certain new and useful Improvements in Grain-Drills; and do hereby declare that the following is a full, clear, and exact description thereof, reference being had to the accompanying drawings, and to the letters of reference marked thereon. In the annexed drawings, making part of this specification—

A represents the frame of the machine, which simply consists of two side rails placed at a suitable distance apart, and connected by two cross-pieces, one at rear and the other in front. This frame rests upon a cross-shaft, B, which said shaft is supported upon a series of rollers, C C C, there being a roller for each drill-tooth. Near one end of shaft B, and outside of the frame, is a gear-wheel, D. This gear-wheel is placed upon shaft B loose, but is made permanent upon the shaft by means of the collar R. This collar R slides upon the end of shaft B, and is provided with a pin, S, which catches against a pin, $t$, on the outer face of the wheel D when it is necessary to make said wheel permanent upon shaft B. This collar is not allowed to revolve independently of the shaft, and it is slid to or from the wheel D by means of a lever, $q$, which connects with it, having a pronged end which embraces the collar, working in a groove near its outer end. J and K represent two seed-boxes, one for grass and the other for grain. Through these seed-hoppers or boxes pass two shafts, I and E. On the outer end of shaft I is a gear-wheel, H, and on the outer end of shaft E is a gear-wheel, G. These two wheels mesh together. F represents an idle-wheel, which is situated between wheel D and wheel G, and communicates motion from wheel D to wheel G. M M represent the ordinary drag-bars, which are hinged at the forward part of the machine to a rod, T. The drill-teeth L are connected to the rear ends of these bars. N N represent chains, which connect the drill-teeth to the cross-bar O. The cross-bar O is provided with a lever-handle, $u$, which serves to raise and lower it. This lever-handle is stationed by catching it in one of a series of notches cut in the edge of a standard, W. By means of this handle $u$ the drill-teeth are elevated or lowered at the will of the operator. V represents the driver's seat, which is placed upon the rear end of the frame A.

This machine operates as follows: Seed being placed in the hoppers, and the machine being drawn forward, the rollers C C, which rest upon the ground, revolve and give motion to the wheel D, and this wheel, through the idle-wheel, communicates motion to the shaft of the seed-hoppers, through their wheels H and G. The revolving of the shafts E and I agitates the seed and causes it to pass through the openings in the bottom of the hoppers, which are constructed in any of the known and usual ways. The rollers C C roll over the ground in rear of the seed-discharge spouts and pack the drills. It will be seen that the drill-teeth L are provided with wings P upon their backs, and these rings cover the grain as fast as it is dropped from the teeth. The rollers C pack the earth as fast as it is turned over the grain by the wings P. By means of the lever $q$ the collar R can be moved from contact with the wheel D; this stops the motion of said wheel, and consequently the motion of the shafts E and I, and the stoppage of these shafts necessarily causes the flow of seed from the hoppers to cease.

Having thus fully described my invention, what I claim as new, and desire to secure by Letters Patent, is—

1. Providing the drill-teeth L with wings P, substantially as and for the purpose set forth.

2. The use of a series of rollers, C C, in combination with the winged drill-teeth for packing the earth after the wings, substantially as set forth.

3. The arrangement of the collar R upon the shaft B, with the wheel D and lever $q$, whereby the seed-shafts are thrown in and out of gear, as and for the purpose set forth.

In testimony that I claim the foregoing invention I have hereunto set my hand this 31st day of May, 1867.

ELIJAH LAKE.

Witnesses:
   A. W. GALE,
   M. WINTERHALTER.